United States Patent
Campbell et al.

(10) Patent No.: US 11,791,470 B2
(45) Date of Patent: Oct. 17, 2023

(54) BATTERY CELL WITH ELECTROLYTE DIFFUSION MATERIAL

(71) Applicant: Apple Inc., Cupertino, CA (US)

(72) Inventors: Christopher T. Campbell, San Jose, CA (US); Andrew C. Chu, Cupertino, CA (US); Tobias Zeilinger, Palo Alto, CA (US); Ghyrn E. Loveness, Mountain View, CA (US); Qingcheng Zeng, San Jose, CA (US); Kenzo Nagai, Fremont, CA (US); Donald G. Dafoe, San Jose, CA (US)

(73) Assignee: Apple Inc., Cupertino, CA (US)

( * ) Notice: Subject to any disclaimer, the term of this patent is extended or adjusted under 35 U.S.C. 154(b) by 403 days.

(21) Appl. No.: 16/658,442

(22) Filed: Oct. 21, 2019

(65) Prior Publication Data

US 2020/0052305 A1    Feb. 13, 2020

Related U.S. Application Data

(63) Continuation of application No. PCT/US2018/028472, filed on Apr. 20, 2018.

(60) Provisional application No. 62/488,247, filed on Apr. 21, 2017.

(51) Int. Cl.
*H01M 4/66* (2006.01)

(52) U.S. Cl.
CPC .................................. *H01M 4/661* (2013.01)

(58) Field of Classification Search
CPC ........ H01M 4/661; H01M 4/667; H01M 4/62; H01M 4/139; H01M 50/463; H01M 10/0418; H01M 10/044; H01M 10/052; H01M 10/0585; Y02E 60/10; Y02P 70/50
See application file for complete search history.

(56) References Cited

U.S. PATENT DOCUMENTS

| | | | |
|---|---|---|---|
| 4,317,864 A | 3/1982 | Strasser | |
| 4,374,186 A | 2/1983 | McCartney et al. | |
| 4,567,119 A | 1/1986 | Lim | |
| 5,162,172 A | 11/1992 | Kaun | |
| 5,254,415 A | 10/1993 | Williams et al. | |
| 5,367,431 A | 11/1994 | Kunishi et al. | |
| 6,004,698 A | 12/1999 | Richardson et al. | |

(Continued)

FOREIGN PATENT DOCUMENTS

| | | |
|---|---|---|
| CN | 1620735 A | 5/2005 |
| CN | 101202355 A | 6/2008 |

(Continued)

OTHER PUBLICATIONS

U.S. Appl. No. 15/742,009, "Notice of Allowance", dated Dec. 24, 2021, 12 pages.

(Continued)

*Primary Examiner* — Kiran Quraishi Akhtar
(74) *Attorney, Agent, or Firm* — Kilpatrick Townsend & Stockton LLP

(57) ABSTRACT

Energy storage devices, battery cells, and batteries of the present technology may include a first current collector, and may include a separator. The battery cell may include a first active material disposed between the first current collector and the separator. The battery cell may include an electrolyte diffusion material disposed between the first active material and the first current collector.

8 Claims, 4 Drawing Sheets

(56) References Cited

U.S. PATENT DOCUMENTS

| | | |
|---|---|---|
| 8,124,266 B2 | 2/2012 | Yamazaki |
| 8,153,410 B2 | 4/2012 | Jaffe |
| 8,357,469 B2 | 1/2013 | Shaffer, II et al. |
| 8,663,833 B2 | 3/2014 | Hosaka et al. |
| 9,142,811 B2 | 9/2015 | Chami |
| 10,916,741 B1 | 2/2021 | Dafoe et al. |
| 10,916,796 B1 | 2/2021 | Zeilinger et al. |
| 10,923,728 B1 | 2/2021 | Zeng |
| 11,018,343 B1 | 5/2021 | Dafoe et al. |
| 11,043,703 B1 | 6/2021 | Zeng et al. |
| 11,189,834 B1 | 11/2021 | Zeng |
| 11,228,074 B2 | 1/2022 | Kaye et al. |
| 11,296,351 B1 | 4/2022 | Gorer et al. |
| 11,296,361 B2 | 4/2022 | Chu et al. |
| 11,335,977 B1 | 5/2022 | Zeng et al. |
| 11,588,155 B1 | 2/2023 | Erb et al. |
| 11,600,891 B1 | 3/2023 | Erb et al. |
| 11,677,120 B2 | 6/2023 | Erb et al. |
| 11,699,815 B1 | 7/2023 | Zeng et al. |
| 2002/0146620 A1 | 10/2002 | Connell |
| 2003/0027051 A1 | 2/2003 | Kejha et al. |
| 2003/0096170 A1 | 5/2003 | Fujiwara et al. |
| 2003/0194605 A1 | 10/2003 | Fauteux et al. |
| 2004/0001302 A1* | 1/2004 | Sato ............... H01M 10/0459 361/502 |
| 2005/0019643 A1 | 1/2005 | Sugita et al. |
| 2005/0106456 A1 | 5/2005 | Puester et al. |
| 2007/0210760 A1 | 9/2007 | Shimamura et al. |
| 2009/0023059 A1 | 1/2009 | Kinoshita et al. |
| 2009/0068531 A1 | 3/2009 | Sawa et al. |
| 2009/0087728 A1* | 4/2009 | Less ............... H01M 10/0525 429/129 |
| 2009/0136832 A1 | 5/2009 | Aihara et al. |
| 2009/0233175 A1 | 9/2009 | Kelley et al. |
| 2009/0297892 A1 | 12/2009 | Ijaz et al. |
| 2010/0124693 A1 | 5/2010 | Kosugi et al. |
| 2010/0134942 A1 | 6/2010 | Wang et al. |
| 2010/0285355 A1 | 11/2010 | Kozinsky et al. |
| 2011/0294007 A1 | 12/2011 | Hosaka et al. |
| 2012/0148913 A1 | 6/2012 | Chiba |
| 2012/0156552 A1 | 6/2012 | Miyazaki et al. |
| 2012/0189896 A1 | 7/2012 | Zhou et al. |
| 2012/0219835 A1 | 8/2012 | Kawabe et al. |
| 2012/0263995 A1 | 10/2012 | Naito et al. |
| 2013/0065106 A1 | 3/2013 | Faust |
| 2013/0089774 A1 | 4/2013 | Chami |
| 2013/0242593 A1 | 9/2013 | LoRocco et al. |
| 2013/0266823 A1 | 10/2013 | Lee |
| 2014/0127542 A1 | 5/2014 | Li et al. |
| 2014/0154542 A1 | 6/2014 | Issaev et al. |
| 2014/0178753 A1* | 6/2014 | Chu ............... H01M 4/62 429/211 |
| 2015/0037616 A1 | 2/2015 | Wyatt et al. |
| 2015/0155564 A1 | 6/2015 | Chami et al. |
| 2015/0228937 A1 | 8/2015 | Spilker |
| 2015/0311490 A1* | 10/2015 | Murase ............ H01M 4/139 524/521 |
| 2015/0325894 A1 | 11/2015 | Merriman et al. |
| 2016/0049646 A1 | 2/2016 | Fujiki et al. |
| 2016/0049679 A1 | 2/2016 | Stevens et al. |
| 2016/0093845 A1 | 3/2016 | DeKeuster et al. |
| 2016/0099456 A1 | 4/2016 | Kwon et al. |
| 2016/0099490 A1 | 4/2016 | Larsson |
| 2016/0111729 A1 | 4/2016 | Kim et al. |
| 2016/0197352 A1* | 7/2016 | Blaser ............ H01M 4/622 429/232 |
| 2016/0248113 A1 | 8/2016 | He et al. |
| 2016/0329535 A1 | 11/2016 | Moomaw et al. |
| 2016/0329606 A1 | 11/2016 | Ro et al. |
| 2017/0012331 A1 | 1/2017 | Ng et al. |
| 2017/0077545 A1 | 3/2017 | Shaffer, II et al. |
| 2017/0133689 A1 | 5/2017 | Moore et al. |
| 2017/0214057 A1 | 7/2017 | Kotik et al. |
| 2018/0013144 A1 | 1/2018 | Li et al. |
| 2018/0219227 A1 | 8/2018 | Moomaw et al. |
| 2018/0226654 A1 | 8/2018 | Ohsawa et al. |
| 2018/0316063 A1 | 11/2018 | Masel et al. |
| 2019/0036147 A1 | 1/2019 | Yuan et al. |
| 2019/0237748 A1 | 8/2019 | Shin et al. |
| 2020/0028166 A1 | 1/2020 | Tanaka et al. |
| 2020/0395594 A1 | 12/2020 | Doi et al. |
| 2022/0111758 A1 | 4/2022 | Ijaz et al. |
| 2022/0111759 A1 | 4/2022 | Ijaz |
| 2022/0115897 A1 | 4/2022 | Ijaz |
| 2023/0026549 A1 | 1/2023 | Ijaz et al. |

FOREIGN PATENT DOCUMENTS

| | | |
|---|---|---|
| CN | 101809801 A | 8/2010 |
| CN | 101884125 A | 11/2010 |
| CN | 102005566 A | 4/2011 |
| CN | 102187504 A | 9/2011 |
| CN | 102272977 A | 12/2011 |
| CN | 102341948 A | 2/2012 |
| CN | 102576850 A | 7/2012 |
| CN | 103069614 A | 4/2013 |
| CN | 103165920 A | 6/2013 |
| CN | 103222098 A | 7/2013 |
| CN | 103548196 A | 1/2014 |
| CN | 103855360 A | 6/2014 |
| CN | 103904294 A | 7/2014 |
| CN | 104466191 A | 3/2015 |
| CN | 104604003 A | 5/2015 |
| EP | 1125336 A1 | 8/2001 |
| EP | 1156547 A1 | 11/2001 |
| EP | 2892097 A1 | 7/2015 |
| EP | 3196955 A1 | 7/2017 |
| EP | 3435473 A1 | 1/2019 |
| JP | 06503442 A | 4/1994 |
| JP | 07161346 A | 6/1995 |
| JP | 2002343452 A | 11/2002 |
| JP | 2003096219 A | 4/2003 |
| JP | 2005005163 A | 1/2005 |
| JP | 2006012556 A | 1/2006 |
| JP | 2007012584 A | 1/2007 |
| JP | 2009224097 A | 10/2009 |
| JP | 2011009203 A | 1/2011 |
| JP | 2011071011 A | 4/2011 |
| JP | 1857710 B2 | 1/2012 |
| JP | 4857710 B2 | 1/2012 |
| JP | 2012234823 A | 11/2012 |
| JP | 2013114746 A | 6/2013 |
| JP | 2013187074 A | 9/2013 |
| JP | 5410822 B2 | 2/2014 |
| JP | 2014029818 A | 2/2014 |
| JP | 2018083957 A | 5/2018 |
| KR | 20130066795 A | 6/2013 |
| WO | 8504287 A1 | 9/1985 |
| WO | 9210861 A1 | 6/1992 |
| WO | 2010111087 A1 | 9/2010 |
| WO | 2016031689 A1 | 3/2016 |
| WO | 2017007827 | 1/2017 |
| WO | 2018057566 A1 | 3/2018 |
| WO | 2018195372 A1 | 10/2018 |
| WO | 2018213601 A2 | 11/2018 |
| WO | 2019059133 A1 | 3/2019 |
| WO | 2019184311 A1 | 10/2019 |
| WO | 2021048028 A1 | 3/2021 |

OTHER PUBLICATIONS

U.S. Appl. No. 16/273,625, "Non-Final Office Action", dated Dec. 24, 2021, 16 pages.

U.S. Appl. No. 16/683,088, "Final Office Action", dated Oct. 12, 2021, 12 pages.

U.S. Appl. No. 16/683,088, "Notice of Allowance", dated Nov. 22, 2021, 8 pages.

China Patent Application No. 201780053071.X, "Office Action", dated Nov. 2, 2021, 20 pages.

International Patent Application No. PCT/US2021/049023, "International Search Report and Written Opinion", dated Dec. 22, 2021, 11 pages.

(56) References Cited

OTHER PUBLICATIONS

PCT/US2018/028472, "International Preliminary Report on Patentability", dated Oct. 31, 2019, 10 pages.
International Patent Application No. PCT/US2017/052413, "International Preliminary Report on Patentability", dated Apr. 4, 2019, 12 pages.
PCT/US2017/052413, "Invitation to Pay Additional Fees", mailed Dec. 8, 2017, 14 pages.
U.S. Appl. No. 15/742,009, "Non-Final Office Action", dated Aug. 3, 2021, 16 pages.
U.S. Appl. No. 16/038,865, "Notice of Allowance", dated Aug. 13, 2021, 8 pages.
U.S. Appl. No. 15/742,009, "Non-Final Office Action", dated Nov. 30, 2020, 13 pages.
U.S. Appl. No. 16/007,534, "Notice of Allowance", dated Nov. 18, 2020, 7 pages.
U.S. Appl. No. 16/108,498, "Final Office Action", dated Dec. 9, 2020, 25 pages.
China Patent Application No. 201680039891.9, "Office Action", dated Oct. 27, 2020, 8 pages.
U.S. Appl. No. 15/742,009, "Non-Final Office Action", dated Nov. 15, 2019, 14 pages.
Japan Patent Appl. No. 2018-500449, "Notice of Decision to Grant", dated Nov. 18, 2019, 2 pages.
PCT/US2018/033218, "International Preliminary Report on Patentability", dated Nov. 28, 2019, 9 pages.
U.S. Appl. No. 16/108,503, Non-Final Office Action, dated Feb. 2, 2022, 9 pages.
PCT/US2020/060348, "International Search Report and Written Opinion", dated Mar. 12, 2021, 9 pages.
PCT/US2020/060350, "International Search Report and Written Opinion", dated Mar. 12, 2021, 12 pages.
Weng, et al., "Three-Electrolyte Electrochemical Energy Storage Systems Using Both Anion- and Cation-Exchange Membranes as Separators", Energy, vol. 167, Jan. 15, 2019, pp. 1011-1018.
U.S. Appl. No. 15/962,133, "Non-Final Office Action", dated Jan. 21, 2020, 37 pages.
Chinese Patent Application No. 201680039891.9, "Office Action", dated Jan. 6, 2020, 21 pages.
China Patent Application No. 201780053071.X, "Office Action", dated Apr. 16, 2021, 21 pages.
U.S. Appl. No. 16/273,625, "Non-Final Office Action", dated May 4, 2020, 14 pages.
U.S. Appl. No. 16/108,498, "Non-Final Office Action", dated Apr. 30, 2020, 28 pages.
Chinese Patent Application No. 201680039891.9, "Office Action", dated Jan. 6, 2020, 23 pages.
Japan Patent Application No. 2018-500449, "Notice of Decision to Grant", dated Nov. 18, 2019, 2 pages.
Korean Patent Application No. 10-2018-7000263, "Notice of Decision to Grant", dated Apr. 8, 2020, 2 pages.
U.S. Appl. No. 16/007,534, "Non-Final Office Action", dated May 5, 2020, 47 pages.
U.S. Appl. No. 15/962,133, "Notice of Allowance", dated Feb. 9, 2021, 8 pages.
U.S. Appl. No. 16/108,522, "Notice of Allowance", dated Feb. 26, 2021, 8 pages.
U.S. Appl. No. 16/273,625, "Final Office Action", dated Feb. 16, 2021, 14 pages.
U.S. Appl. No. 15/962,133, "Final Office Action", dated Jul. 7, 2020, 23 pages.
Chinese Patent Application No. 201680039891.9, "Office Action", dated Jun. 10, 2020, 18 pages.
U.S. Appl. No. 16/263,890, "Non-Final Office Action", dated Jun. 16, 2020, 9 pages.
U.S. Appl. No. 16/683,088, "Non-Final Office Action", dated Sep. 2, 2021, 10 pages.
U.S. Appl. No. 16/683,091, "Non-Final Office Action", dated Aug. 18, 2021, 22 pages.

Boeva et al., "Soluble and Highly Ionically Conducting Interpolyelectrolyte Complexes Prepared Via Chemical Template Polymerization of Aniline in the Presence of Perfluorinated Polysulfonic Acid", The Royal Society of Chemistry; vol. 4, 2014, pp. 56677-56681.
THUC, "Study on Synthesis and Characterization of Anion Exchange Membrane Based on Poly (Vinyl Alcohol) Modified by Freeradical Polymerization", International Journal of Electrochemical Science; vol. 15, 2020, pp. 8190-8199.
U.S. Appl. No. 16/049,250, "Non-Final Office Action", dated Apr. 8, 2020, 8 pages.
U.S. Appl. No. 16/038,865, "Final Office Action", dated Jun. 1, 2021, 7 pages.
U.S. Appl. No. 16/108,498, "Non-Final Office Action", dated May 17, 2021, 21 pages.
U.S. Appl. No. 16/108,503, "Final Office Action", dated May 25, 2021, 9 pages.
U.S. Appl. No. 16/522,475, "Non-Final Office Action", dated May 17, 2021, 17 pages.
U.S. Appl. No. 15/742,009, "Final Office Action", dated Aug. 19, 2020, 13 pages.
U.S. Appl. No. 16/108,522, "Non-Final Office Action", dated Sep. 9, 2020, 10 pages.
European Patent Application 16738994.9, "Notice of Decision to Grant", dated Sep. 24, 2020, 2 pages.
U.S. Appl. No. 16/049,250, "Notice of Allowance", dated Oct. 7, 2020, 22 pages.
U.S. Appl. No. 16/108,503, "Non-Final Office Action", dated Oct. 2, 2020, 61 pages.
EP Patent Application No. 16738994 9, "Communication Pursuant to Rules 161(1) and 162 EPC", dated Mar. 23, 2018, 3 pages.
JP Patent Application No. 2018-500449, "Office Action", dated Jan. 21, 2019, 11 pages.
KR Patent Application No. 10-2018-7000263, "Office Action", dated Feb. 28, 2019, 5 pages.
KR Patent Application No. 10-2018-7000263, "Office Action", dated Sep. 27, 2019, 16 pages.
PCT/US2016/041151, "International Preliminary Report on Patentability", dated Jan. 18, 2018, 8 pages.
PCT/US2016/041151, "International Search Report and Written Opinion", dated Aug. 25, 2016, 10 pages.
PCT/US2017/052413, "International Search Report and Written Opinion", dated Feb. 1, 2018, 19 pages.
PCT/US2018/028472, "International Search Report and Written Opinion", dated Jul. 27, 2018, 13 pages.
PCT/US2018/033218, "International Search Report and Written Opinion", dated Nov. 16, 2018, 13 pages.
U.S. Appl. No. 16/038,865, "Non-Final Office Action", dated Nov. 6, 2020, 13 pages.
U.S. Appl. No. 16/263,890, "Notice of Allowance", dated Oct. 23, 2020, 8 pages.
U.S. Appl. No. 16/108,498, "Corrected Notice of Allowability", dated Mar. 9, 2022, 2 pages.
U.S. Appl. No. 16/108,498, Notice of Allowance, dated Feb. 24, 2022, 11 pages.
U.S. Appl. No. 17/014,637, Non-Final Office Action, dated Feb. 24, 2022, 20 pages.
International Patent Application No. PCT/US2021/049023, International Preliminary Report on Patentability, dated Mar. 23, 2023, 8 pages.
U.S. Appl. No. 16/108,503, "Final Office Action", dated Oct. 12, 2022, 8 pages.
U.S. Appl. No. 16/273,625, "Notice of Allowance", dated Sep. 1, 2022, 12 pages.
U.S. Appl. No. 16/613,094, "Non Final Office Action", dated Aug. 19, 2022, 16 Pages.
U.S. Appl. No. 17/014,550, "Notice of Allowance", dated Oct. 18, 2022, 10 pages.
U.S. Appl. No. 17/014,637, "Non-Final Office Action", dated Jul. 25, 2022, 20 pages.
U.S. Appl. No. 17/014,717, "Non-Final Office Action", dated Oct. 13, 2022, 14 pages.

(56) References Cited

OTHER PUBLICATIONS

U.S. Appl. No. 17/014,768, "Non-Final Office Action", dated Jun. 30, 2022, 10 pages.
U.S. Appl. No. 17/014,768, "Notice of Allowance", dated Nov. 4, 2022, 7 pages.
U.S. Appl. No. 17/353,059, "Non-Final Office Action", dated Nov. 1, 2022, 8 pages.
China Patent Application No. 201780053071.X, "Office Action", dated Aug. 30, 2022, 29 pages.
China Patent Application No. 201780053071.X, "Office Action", dated Mar. 18, 2022, 15 pages.
China Patent Application No. 201880026199.1, "Office Action", dated Mar. 3, 2022, 8 pages.
China Patent Application No. 202011204662.2, "Office Action", dated Aug. 26, 2022, 14 pages.
China Patent Application No. 202011211648.5, "Office Action", dated Aug. 19, 2022, 12 pages.
PCT/US2020/060348, "International Preliminary Report on Patentability", dated May 27, 2022, 8 pages.
PCT/US2020/060350, "International Preliminary Report on Patentability", dated May 27, 2022, 8 pages.
China Patent Application No. 201880026199.1, Office Action, dated May 10, 2023, 20 pages.
Thaler et al., "Automotive Battery Technology", Beijing Institute of Technology Press, Feb. 28, 2017, 5 pages.

\* cited by examiner

BATTERY CELL WITH ELECTROLYTE DIFFUSION MATERIAL

CROSS REFERENCE WITH RELATED APPLICATION

This application is a continuation of International Patent Application No. PCTUS2018028472, filed Apr. 20, 2018, which claims the benefit of U.S. Provisional Patent Application No. 62/488,247 filed Apr. 21, 2017, the disclosures of which are hereby incorporated by reference in their entirety for all purposes.

TECHNICAL FIELD

The present technology relates to batteries and battery components. More specifically, the present technology relates to battery cells with materials to assist electrolyte diffusion and distribution.

BACKGROUND

In batteries and battery cells, injection of electrolyte materials may be an involved process. Additionally, permeation of electrolyte materials may take extensive periods of time. Improved designs and processes are needed.

SUMMARY

The present technology relates to energy storage devices, including battery cells and batteries, which may include lithium-ion batteries having a variety of shapes including stacked cells, which may be or include bipolar batteries as well as batteries stacked in any orientation including vertical and horizontal, for example. These devices may include current collectors configured based on a z-direction transmission of current through the cell components, although current collectors configured based on an xy-directional transmission of current may also benefit from the present designs. The batteries and cells may include a host of features and material configurations as will be described throughout the disclosure.

Energy storage devices, battery cells, and batteries of the present technology may include a first current collector, and may include a separator. The battery cell may include a first active material disposed between the first current collector and the separator. The battery cell may include an electrolyte diffusion material disposed between the first active material and the first current collector.

In some embodiments, the electrolyte diffusion material may include a polymer material having a conductive material disposed within the polymer. The conductive material may include a material electrically stable at the operating potential of the first current collector. The conductive material may include copper, aluminum, stainless steel, or a carbon-containing material. The polymer may include one or more of poly(vinylidene fluoride-hexafluoropropylene), polypropylene, polyethylene glycol, or a fluorinated polymer. The electrolyte diffusion material may be characterized by a thickness less than 5 μm. The electrolyte diffusion material may be characterized by a swelling ratio of greater than or about 2. In embodiments the battery cell may also include a second current collector. The battery cell may include a second active material disposed between the separator and the second current collector. The battery cell may further include an electrolyte diffusion material disposed between the second active material and the second current collector. In some embodiments, the electrolyte diffusion material disposed between the second active material and the second current collector may be characterized by a thickness greater than a thickness of the electrolyte diffusion material disposed between the first active material and the first current collector.

The present technology also encompasses battery cells including an anode current collector. The battery cells may include a cathode current collector, and may include a separator. The battery cells may include an anode active material disposed between the anode current collector and the separator. The battery cells may include a cathode active material disposed between the separator and the cathode current collector. The battery cells may include a first anode electrolyte diffusion material disposed between the anode active material and the anode current collector. The battery cells may also include a first cathode electrolyte diffusion material disposed between the cathode active material and the cathode current collector. The battery cells may further include a second cathode electrolyte diffusion material disposed between the cathode active material and the separator.

In some embodiments the first cathode electrolyte diffusion material may include a polymer having a first conductive material comprising aluminum or a carbon-containing material incorporated with the polymer. The second cathode electrolyte diffusion material may include a porous polymer configured to permit ion diffusion through the second cathode electrolyte diffusion material. The first cathode electrolyte diffusion material may be characterized by a swelling ratio of greater than or about 5 when contacted by an electrolyte. The second cathode electrolyte diffusion material may be characterized by a swelling ratio of greater than or about 2 when contacted by an electrolyte. The first cathode electrolyte diffusion material may be characterized by a conductivity greater than the second cathode electrolyte diffusion material. The second cathode electrolyte diffusion material may be characterized by a thickness greater than the first cathode electrolyte diffusion material. The battery cells may further include a second anode electrolyte diffusion material disposed between the anode active material and the separator. At least one of the anode current collector and the cathode current collector may include a polymer, and in some embodiments at least one of the electrolyte diffusion materials may include poly(vinylidene fluoride-hexafluoropropylene).

The present technology also encompasses methods of forming a battery cell. The methods may include applying an electrolyte diffusion material to a current collector. The electrolyte diffusion material may include a polymer swelled with an electrolyte. The methods may also include forming an electrode active material on the electrolyte diffusion material. The methods may also include expressing the electrolyte into the electrode active material from the electrolyte diffusion material.

Such technology may provide numerous benefits over conventional technology. For example, the present devices may provide improved delivery of electrolyte materials into electrode active materials. Additionally, the designs may reduce the time for electrolyte materials to diffuse through a battery cell. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

Figure 1:
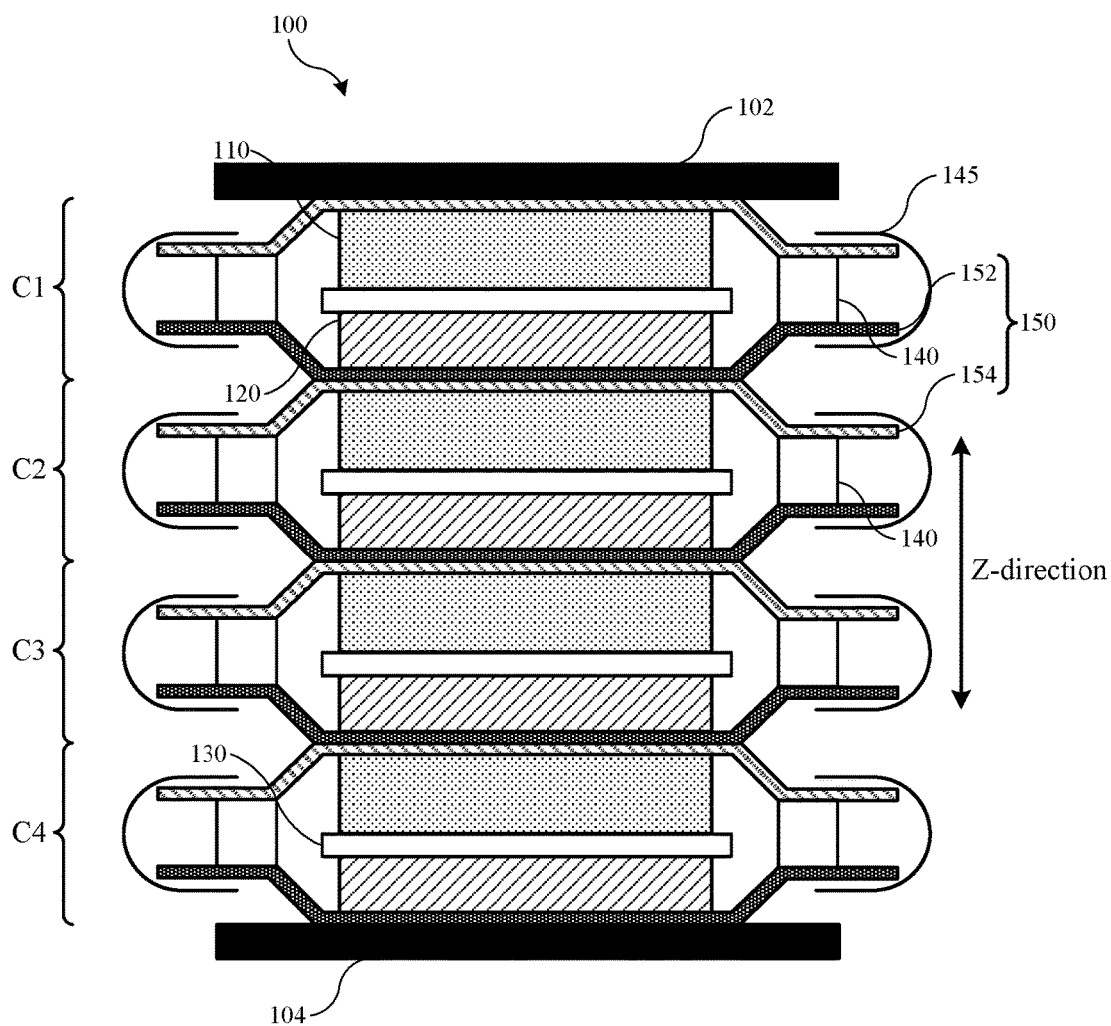
FIG. 1 shows a schematic cross-sectional view of an energy storage device according to embodiments of the present technology.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Batteries, battery cells, and more generally energy storage devices, may undergo a series of processes during the formation or fabrication process. The processes may include delivering an electrolyte into a cell, and then allowing the electrolyte to permeate the electrode active materials and separator, to promote ionic conductivity through the cell. The process of delivering the electrolyte has previously caused issues with homogenous delivery of the materials, as well as an associated time for diffusion that may be excessive. For example, in many conventional cell designs, an entry point within the cell pouch or enclosure may allow delivery of an electrolyte at one of the final steps in fabrication. A needle may be inserted within the entry point to inject an amount of electrolyte. Once injected, the electrolyte may diffuse through the various materials.

This conventional process may involve multiple operations for the delivery. For example, this delivery style may foam the electrolyte near the entry point, which may cause the electrolyte to pool near the entry. Accordingly, multiple injections may be required, followed by periods of diffusion, to account for this pooling effect. Additionally, the process of electrolyte permeation may involve additional processing. The time for electrolyte to diffuse through the active material layers may be extensive due to the qualities of the materials used. In some cases, pressure cycles may be applied to the cell to generate a pumping effect to further assist electrolyte diffusion. Even with these additional processes, homogenous distribution of electrolyte may be difficult to achieve. Moreover, as battery cell designs develop, individual cells may be characterized by greater form factors that may extend to the meter scale or greater. Conventional processes would necessitate prohibitively long periods of time to distribute electrolyte across and through layers of this scope.

The present technology addresses many of these issues by providing an additional material layer along a current collector, and adjacent an electrode active material. This additional material may include an amount of electrolyte that can be expressed from the material and into the active material. By incorporating the electrolyte within an additional material layer, a more homogenous distribution of electrolyte may be provided. Additionally, the time to distribute the electrolyte into the active material may be less than the conventional time required, as the diffusion may be performed across an entire surface of the active material, and may also be performed in a single operation.

Although the remaining portions of the description will routinely reference lithium-ion batteries, it will be readily understood by the skilled artisan that the technology is not so limited. The present designs may be employed with any number of battery or energy storage devices, including other rechargeable and primary, or non-rechargeable, battery types, as well as electrochemical capacitors also known as supercapacitors or ultracapacitors. Moreover, the present technology may be applicable to batteries and energy storage devices used in any number of technologies that may include, without limitation, phones and mobile devices, handheld electronic devices, laptops and other computers, appliances, heavy machinery, transportation equipment including automobiles, water-faring vessels, air travel equipment, and space travel equipment, as well as any other device that may use batteries or benefit from the discussed designs. Accordingly, the disclosure and claims are not to be considered limited to any particular example discussed, but can be utilized broadly with any number of devices that may exhibit some or all of the electrical or chemical characteristics of the discussed examples.

FIG. 1 depicts a schematic cross-sectional view of an energy storage device according to embodiments of the present technology. The energy storage devices may include a single current collector or coupled current collectors. The energy storage devices may operate in a conventional manner with regard to electronic flow across or through material layers, such as providing electronic mobility across an xy-plane of the current collectors. Additionally, the described devices may operate by electronic flow through the structure in a z-direction through individual cells as opposed to via tabbed current collectors as described above for conventional batteries.

As illustrated, the stacked battery 100 may include a stack of electrochemical cells C1, C2, C3, and C4 between end plates 102 and 104. End plates 102 and 104 may be metal current collector plates, which can serve both electrical and mechanical functions. In some embodiments, end plates 102 and 104 can be support plates that form part of an external housing of the stacked battery. End plates 102 and 104 may also provide mechanical support within a housing of the stacked battery. Some or all of the support plates may be electrically conductive, and there may be a terminal within the support plate that is electrically connected to the end plate. In embodiments an additional plate similar to end plates 102 and 104 may be disposed within the stack of cells, such as between two cells. This configuration including an additional plate may provide structural rigidity, and the additional plate may also preform electronic functions similar to end plates 102, 104. End plates 102 and 104 may act as positive and negative terminals of the battery. The cells may pass current in the z-direction through individual cells to the end plates, which may transfer current in any direction across the plate and from the battery.

The stack of electrochemical cells may include any number of electrochemical cells depending on the selected voltage for the stacked battery 100, along with the individual voltage of each individual electrochemical cell. The cell stack may be arranged with as many or as few electrochemical cells in series as desired, as well as with intervening plates for support and current transfer. The cells C may be positioned adjacent, e.g. abutting, one another in some configurations. Each electrochemical cell C may include a cathode 110 and an anode 120, where the cathode 110 and anode 120 may be separated by separator 130 between the cathode and anode. Between the anode 120 of cell C1 and the cathode of adjacent cell C2 may be a stacked current collector 150. The stacked current collector 150 may form part of C1 and C2. On one side, stacked current collector 150 may be connected to the seal 140 of C1 and connected on an opposing side to the seal 140 of C2.

In some embodiments, as shown in FIG. 1, stacked current collector 150 may include a first current collector 152 and a second current collector 154. In embodiments one or both of the current collectors may include a metal or a non-metal material, such as a polymer or composite. As shown in the figure, in some embodiments the first current collector 152 and second current collector 154 can be different materials. In some embodiments, the first current collector 152 may be a material selected based on the potential of the anode 120, such as copper or any other suitable metal, as well as a non-metal material including a polymer. The second current collector may be a material selected based on the potential of the cathode 110, such as aluminum or other suitable metals, as well as a non-metal material including a polymer. In other words, the materials for the first and second current collectors can be selected based on electrochemical compatibility with the anode and cathode active materials used.

The first and second current collectors can be made of any material known in the art. For example, copper, aluminum, or stainless steel may be used, as well as composite materials having metallic aspects, and non-metallic materials including polymers. In some instances the metals or non-metals used in the first and second current collector can be the same or different. The materials selected for the anode and cathode active materials can be any suitable battery materials. For example, the anode material can be silicon, graphite, carbon, a tin alloy, lithium metal, a lithium containing material, such as lithium titanium oxide (LTO), or other suitable materials that can form an anode in a battery cell. Additionally, for example, the cathode material can be a lithium-containing material. In some embodiments, the lithium-containing material can be a lithium metal oxide, such as lithium cobalt oxide, lithium manganese oxide, lithium nickel manganese cobalt oxide, lithium nickel cobalt aluminum oxide, or lithium titanate, while in other embodiments, the lithium-containing material can be a lithium iron phosphate, or other suitable materials that can form a cathode in a battery cell.

The first and second current collectors may have any suitable thickness, and may have a thickness that allows for a seal to be formed and provides suitable mechanical stability to prevent failure, such as breakage of the layers, during anticipated usage of the stacked battery. Additionally, the thickness of the current collectors can be sufficiently thin to allow for bending and flexing in the separation region to accommodate expansion anticipated during cycling of the stacked battery, including, for example, up to 10% expansion in the z-direction.

Figure 2:
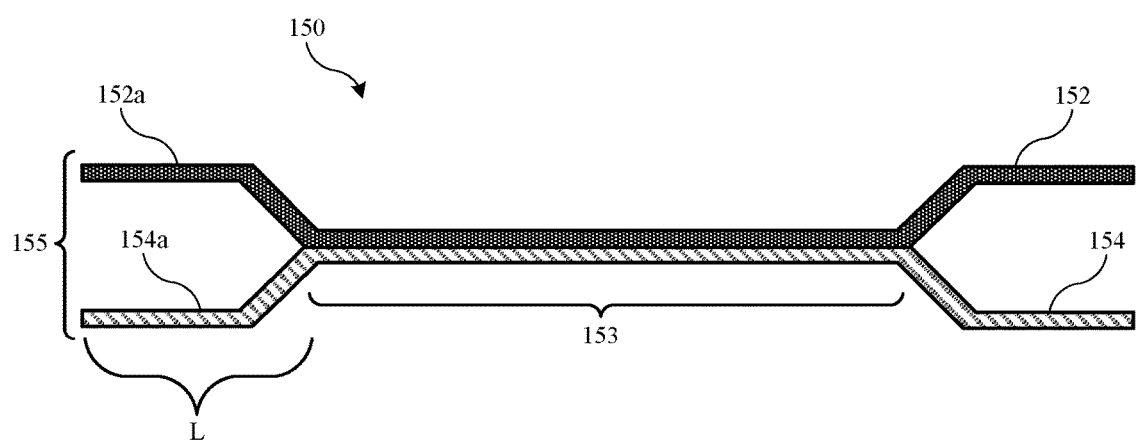
FIG. 2 shows a schematic cross-sectional view of a current collector according to embodiments of the present technology.

Turning to FIG. 2, the stacked current collector 150 may have a connection region 153 where the first current collector 152 and second current collector 154 may be connected, and a gap region 155 at the peripheral ends of the collector 150. In the connection region 153, the first current collector and second current collector may be in direct contact or otherwise joined to be electrically-conductive. In some embodiments, the first current collector and second current collector may be directly connected, while in other embodiments the first current collector and second current collector may be indirectly connected via a conductive material. To form the connection region 153, the first current collector 152 and the second current collector 154 may be laminated together. Additionally, the connection region 153 may be created by welding the first current collector 152 and the second current collector 154 together. The connection region 153 may also be created by using an adhesive, which may be electrically conductive, between the first current collector 152 and the second current collector 154. In other embodiments, the connection region 153 may be created by the wetting that can occur between the materials of the first current collector 152 and the second current collector 154.

In the gap region 155, the peripheral ends of the first current collector 152 and the second current collector 154 may be spaced apart and moveable relative to each other. As such, there may be a separation distance between the first and second current collectors, which may increase as the electrochemical cell swells. In some embodiments, the spaced apart peripheral ends of the first current collector 152 and the second current collector 154 may be of a length that is sufficient to accommodate an anticipated expansion of the individual electrochemical cells of the stacked battery during cycling of the battery. The peripheral ends of the current collectors 152*a* and 154*a* may have a length L, as shown in FIG. 2, which may be long enough that up to or at least about 10% expansion in the z-direction can be accommodated.

As shown in FIG. 1, each cell C1, C2, C3, and C4, also includes a seal 140, which, with the current collector layers, may electrochemically isolate the electrochemical cells from each other. Thus, each cathode-anode pair may be electrochemically sealed and isolated from neighboring electrochemical cells. Because the current collectors 152 and 154 may be separated at the peripheral ends, separate seals 140 can be formed on opposing sides, such as a top and bottom, of the stacked current collector 150. The seals 140 may be the same or different materials, and each seal 140 may also be a laminate, composite, or coupling of two or more materials in embodiments.

The seal material may be able to bond with the first and second layers of the stacked current collector to prevent electrolyte leakage. The seal material may be a polymer, an epoxy, or other suitable electrically-insulating material that can bond with first and second current collectors to create a seal, which may be a hermetic seal. In some embodiments, the polymer may be polypropylene, polyethylene, polyethylene terephthalate, polytrimethylene terephthalate, polyimide, or any other suitable polymer that may bond with the first and second current collectors of the stacked current collector to form a hermetic seal and may also provide resistance to moisture ingress. The electrolyte may be a solid, a gel, or a liquid in embodiments. The seal may electrochemically isolate each electrochemical cell by hermetically sealing the cell, thereby preventing ions in the electrolyte from escaping to a neighboring electrochemical cell. The seal material may be any material providing adequate bonding with the metal layers such that the seal may be maintained through a predetermined period of time or battery usage.

The separator may be wetted with the electrolyte, such as a fluid electrolyte or gel electrolyte, to incorporate the electrolyte into the stacked battery. Alternatively, a gel electrolyte may coat the separator. In still further alternatives, a gel electrolyte may coat the first metal layer and/or second metal layer before combination. Additionally, the electrolyte may be blended with particles of electrode active material. In various embodiments, incorporating the electrolyte into the components of the stacked battery may reduce gassing in the stacked battery. In variations that include a flexible seal, the stacked battery may accommodate gas resulting from degassing.

The individual electrochemical cells may be formed in any suitable manner. In some embodiments, the cathode 110, the anode 120, and the separator 130 may be preassembled. A first current collector 152 may then be connected to the anode while a second current collector 154 may be connected to the cathode to create a cell. The seal material may be disposed between the first current collector 152 and the second current collector 154 to form seals 140. Finally, the peripheral ends of the sealed electrochemical cell may be further taped to frame the cell. Tapes 145, as well as other coatings, sealing, or material layers, may be disposed around the outer perimeter of the metal layers and seals. The tape 145 may be substituted with ceramic or polymeric materials. Tape 145 may be included for various reasons including to prevent shorting to adjacent layers or to surrounding conductive surfaces within the device, to provide improved electrochemical or chemical stability, and to provide mechanical strength.

FIGS. 1 and 2 illustrate an exemplary stacked battery design according to the present technology. Additional configurations other than illustrated, or as variations on the designs, are also encompassed by the present technology. For example, certain embodiments may not include an additional seal material, and first current collector 152 and second current collector 154 may be directly coupled or bonded together. Additionally, the current collectors may include designs including combinations of polymer material and conductive materials, such as within a matrix.

An exemplary matrix for a current collector may include a polymer disposed as the matrix material or as part of the matrix material. The matrix may provide an insulative design that limits or reduces xy-directional conductivity. The polymer matrix may be developed with a conductive material to produce a current collector having particular electrochemical or composite properties, such as electrical conductivity in the z-direction or through the cell. For example, conductive particulate material may be incorporated within the matrix. The conductive material may include any of the conductive materials previously identified. In embodiments, the conductive material may include one or more of silver, aluminum, copper, stainless steel, and a carbon-containing material. In this way, the current collector may have a tuned resistivity to provide directional control for electrical conductivity. For example, the produced current collector may be configured to provide an in-plane resistivity across a length in the xy-plane, as well as a through-plane resistivity in the z-direction, which is greater than or about $1 \times 10^{-4}$ ohm-m in embodiments. Additionally, exemplary current collectors may have an in-plane and through-plane resistivity of between about $1 \times 10^{-3}$ ohm-m and about 1,000 ohm-m. In other embodiments, more conventional electrical distribution may be employed, where current is transferred along conductive current collectors into and out of the cell.

Figure 3:
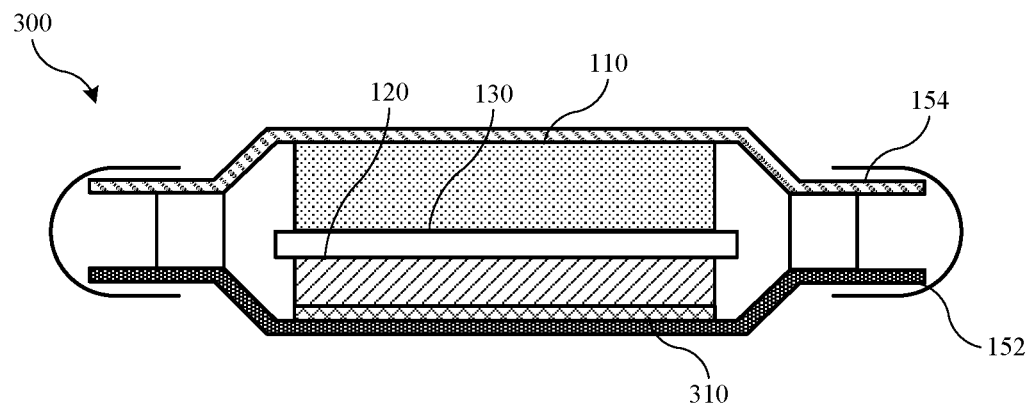
FIG. 3 shows a schematic cross-sectional view of a portion of an energy storage device according to embodiments of the present technology.

Turning to FIG. 3 is shown a schematic cross-sectional view of a portion of an energy storage device 300 according to embodiments of the present technology. As illustrated, energy storage device 300 may include a battery cell, and may include multiple battery cells similar to those discussed above with regard to FIGS. 1 and 2. Energy storage device 300 is shown as a single cell for illustrative purposes, but it is to be understood that energy storage devices encompassed by the present technology may include one or more cells up to hundreds or thousands of coupled cells in some multi-cell battery designs. Similar to FIG. 1, energy storage device 300 may include a number of cells, and each cell may include a first current collector 152 and a second current collector 154. In embodiments, at least one of the first current collector 152 and the second current collector 154 may be a non-metal current collector, although either or both current collectors may be metal or a conductive material in embodiments. Any of the cell components may be or include any of the materials discussed above with regard to FIGS. 1 and 2.

Additionally within each cell may be electrode components. A first active material 120 may be disposed over first current collector 152. Energy storage device 300 may have a separator 130 disposed within the cell. The separator 130 may be positioned between active material layers, and may provide an electronic barrier between an anode material and a cathode material, while permitting ionic transport across the separator 130. The separator may be any of the materials previously described, and my include a polymeric material in embodiments. First active material 120 may be disposed between the first current collector 152 and the separator 130 in embodiments. A second active material 110 may also be included within the cell, and may be disposed between the separator 130 and the second current collector 154 in embodiments. An electrolyte diffusion material 310 may also be incorporated within the battery cell structure of energy storage device 300. In embodiments, electrolyte diffusion material 310 may be disposed between the first active material 120 and the first current collector 152, although in other embodiments, the electrolyte diffusion material 310 may be positioned in additional and alternative positions, as will be discussed further below.

Electrolyte diffusion material 310 may be positioned between current collector 152 and first active material 120 to enable distribution of electrolyte into the first active material 120 during fabrication. Energy storage device 300 may illustrate a completed cell subsequent distribution of electrolyte, although electrolyte diffusion material 310 may remain. The residual material may be or include a polymeric structure characterized by a number of properties that afford applicability as an electrolyte distribution material, and a material that may be located proximate a current collector of a battery.

When electrolyte diffusion material 310 is positioned adjacent a current collector, as illustrated, the electrolyte diffusion material 310 may include a conductivity aspect to limit capacity effects on the battery cell. For example, the polymeric material forming electrolyte diffusion material 310 may include a conductive material incorporated within the polymeric matrix. The conductive material may enable electrical conductivity through the electrolyte diffusion material 310, so that electrons may be passed between active material 120 and current collector 152. The conductive material may be incorporated to reduce a resistivity of electrolyte diffusion material 310 below a threshold enabling a particular operational efficiency of the cell. For example, the conductive material may be included to reduce an added resistance of electrolyte diffusion material 310 below or about 10% added resistance through the cell, and may reduce the resistance below or about 5% added resistance, below or about 4% added resistance, below or about 3% added resistance, below or about 2% added resistance, below or about 1% added resistance, below or about 0.8% added resistance, below or about 0.6% added resistance, below or about 0.5% added resistance, below or about 0.4% added resistance, below or about 0.3% added resistance, below or about 0.2% added resistance, below or about 0.1% added resistance, below or about 0.01% added resistance, below or about 0.001% added resistance, or lower in embodiments. In some embodiments, the conductive material may be incorporated to substantially or essentially negate added resistance from the polymeric material.

The conductive material may be any conductive material, including any of the materials previously described. In embodiments the conductive material may be similar to the material composing the associated current collector. For example, with the electrolyte diffusion material coupled with or adjacent a current collector, the conductive material may be a material that is electrically stable at the operating potential of the current collector. As examples not intended to limit the technology, an exemplary first current collector 152 may be an anode current collector, which may be or include copper. The conductive material incorporated within electrolyte diffusion material 310 may also be copper, although other conductive materials may be used. For example, depending on the first current collector 152 composition, the conductive material may be or include copper, aluminum, stainless steel, a carbon-containing material, silver, or any number of other conductive elements that may be electrochemically stable at the potential at which the first current collector 152 is operated.

The amount of conductive material may also be included in an amount dependent on the type of cell. In a cell in which electronic transfer may occur in an xy-direction across a current collector, more conductive material may be included within the electrolyte diffusion material to increase the conductivity through the layer. In a cell in which electronic transfer may occur in a z-direction through the cell as discussed above, lower conductivity requirements through the electrolyte diffusion material may be acceptable, which may reduce the amount of conductive material utilized within the electrolyte diffusion material in some embodiments.

The electrolyte diffusion material may be characterized by a thickness within the cell. The electrolyte diffusion material may be characterized by a minimal thickness within the cell subsequent delivery of the electrolyte contained within the electrolyte diffusion material to limit the amount of cell volume lost. The thicker the residual material within the cell, the less volume may be occupied by active material, which may reduce the capacity of the battery cell. Accordingly, in embodiments, the electrolyte diffusion material may be characterized by a thickness less than or about 20 μm subsequent delivery of electrolyte to an associated active material layer. In some embodiments, the electrolyte diffusion material 310 may be characterized by a thickness less than or about 15 μm subsequent delivery of electrolyte, and may be characterized by a thickness less than or about 10 μm, less than or about 9 μm, less than or about 8 μm, less than or about 7 μm, less than or about 6 μm, less than or about 5 μm, less than or about 4 μm, less than or about 3 μm, less than or about 2 μm, less than or about 1 μm, less than or about 800 nm, less than or about 600 nm, less than or about 500 nm, less than or about 400 nm, less than or about 300 nm, less than or about 200 nm, less than or about 100 nm, less than or about 50 nm, less than or about 10 nm, or less in embodiments. Prior to the diffusion, the electrolyte diffusion material may be characterized by a thickness that is up to, about, or at least about 2 times the thickness of the electrolyte diffusion material subsequent delivery of the electrolyte. In some embodiments, the electrolyte diffusion material when swelled with electrolyte may be at least about 3 times the thickness of the electrolyte diffusion material subsequent delivery of the electrolyte, and may be at least about 4 times the thickness, at least about 5 times the thickness, at least about 6 times the thickness, at least about 7 times the thickness, at least about 8 times the thickness, at least about 9 times the thickness, at least about 10 times the thickness, at least about 15 times the thickness, at least about 20 times the thickness, or more in embodiments.

The thickness of the electrolyte diffusion material within a completed battery cell may be affected by characteristics of the materials forming the electrolyte diffusion material, including a swelling characteristic of the components. For example, a polymer or constituent components utilized in the electrolyte diffusion material may produce a swelling ratio for the electrolyte diffusion material. The swelling ratio may be a ratio of a volume of the electrolyte diffusion material upon application or when saturated with electrolyte against a volume of the electrolyte diffusion material subsequent delivery of electrolyte to an associated active material or prior to incorporation of electrolyte within the material. The volumetric difference may define an amount of electrolyte that may be included within the electrolyte diffusion material. Thus, for example, for a given volume of polymeric or constituent components within an electrolyte diffusion material, the swelling ratio may define the volume of electrolyte that may be included within the electrolyte diffusion material.

In some embodiments, the swelling ratio may be greater than or about 2, where a thickness or volume of the electrolyte diffusion material subsequent delivery of electrolyte is half the thickness or volume of the electrolyte diffusion material when applied to a current collector, or when saturated with electrolyte. Such a swelling ratio may define that for a given volume of polymeric or other constituent materials of the electrolyte diffusion material, twice that volume of solvent may be incorporated within the electrolyte diffusion material. Because the electrolyte diffusion material may swell three-dimensionally, thickness change may not be exactly equivalent to a volumetric change, although the skilled artisan will understand the effect being described via comparative thickness change in this discussion. The swelling ratio of exemplary electrolyte diffusion materials may also be greater than or about 3, greater than or about 5, greater than or about 7, greater than or about 10, greater than or about 15, greater than or about 20, greater than or about 30, greater than or about 50, greater than or about 75, greater than or about 100, greater than or about 250, greater than or about 500, greater than or about 750, greater than or about 1000, greater than or about 5000, or greater. The swelling ratio may also be between about 2 and about 5000, between about 5 and about 1000, or any other range within any of these stated ranges, or between any number included in any of the stated ranges.

The swelling ratio may affect multiple aspects of the battery cell design, and a higher swelling ratio may be advantageous. For example, a higher swelling ratio may allow less material to be utilized, and may reduce the volume occupied by the residual electrolyte diffusion material in the final cell subsequent delivery of the electrolyte. A higher swelling ratio may also impact the amount of conductive material utilized in the as-deposited electrolyte diffusion material. For example, an electrolyte diffusion material that reduces in volume or thickness by half subsequent delivery of electrolyte, may require additional conductive material compared to an electrolyte diffusion material that reduces in volume or thickness by 100. Because the residual thickness of the first electrolyte diffusion material may be many times greater than the thickness of the second, additional conductive material may be required in the first electrolyte diffusion material to provide adequate conductivity across the thickness and between the current collector and the associated active material.

The amount of electrolyte diffusion material utilized within a cell may be a function of the amount of electrolyte determined for the cell. This amount may be affected by the active material and separator to which the electrolyte may be distributed, as well the overall size of the cell. For example, an active material, which may be either an anode active material or a cathode active material, may be characterized by a volume and porosity within the cell, which may define an amount or free volume of space for electrolyte to be included. This volume may be divided by the swelling ratio of the electrolyte diffusion material being used, which as discussed above may define the volume of electrolyte that may be incorporated within a given volume of electrolyte diffusion material. The resulting figure may define a volume of space within the cell that will be occupied by the residual electrolyte diffusion material, or an amount that may be utilized in fabrication in embodiments in which electrolyte is applied to saturate the electrolyte diffusion material subsequent deposition or formation on a current collector or other layer.

The electrolyte diffusion material may include one or more components that may include conductive materials, polymers, binders, or other materials to provide a swelling ratio, structural stability, electrochemical stability, mechanical stability, or other characteristics of an exemplary electrolyte diffusion material. The electrolyte diffusion material may include one or more polymeric materials, which may include any of the polymeric materials previously described, such as with regard to separator materials. The electrolyte diffusion material may include, as non-limiting examples, polypropylene, polyethylene glycol, poly(vinylidene fluoride-hexafluoropropylene), or any other polymer that may absorb and release electrolyte materials as previously described. The electrolyte diffusion materials may be configured to absorb and release any number of electrolyte materials, which may include, for example, dimethyl carbonate, diethyl carbonate, propylene carbonate, acetonitrile, ethyl acetate, or other materials which may be used as solvents with one or more salts, such as lithium-containing salts. The electrolyte diffusion materials may also be functionalized to adhere to a current collector, which may be metal or a non-metal, such as a polymer or other materials such as a separator, which will be described further below. In embodiments in which the current collector with which the electrolyte diffusion material is coupled is a polymer, adhesion between the polymers may be facilitated by the polymers relative to adhering a polymeric material to a metallic current collector, and less or no functionalization of the electrolyte diffusion material may be used.

Figure 4:
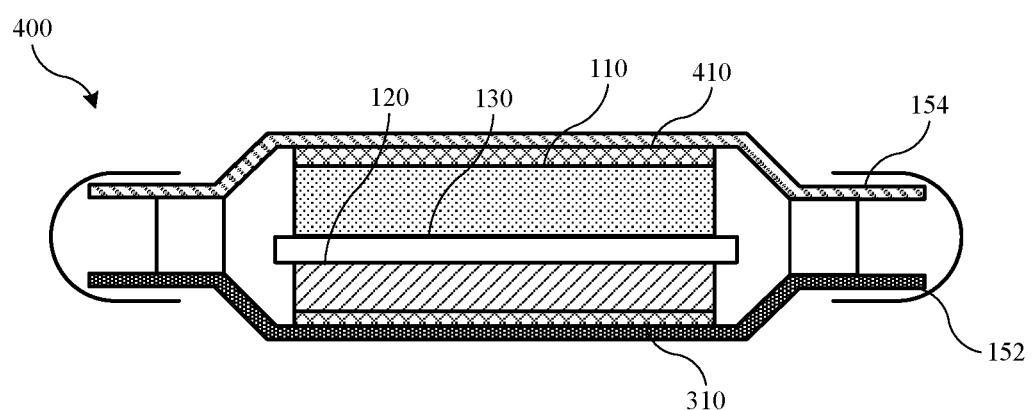
FIG. 4 shows a schematic cross-sectional view of a portion of an energy storage device according to embodiments of the present technology.

Electrolyte diffusion materials may be used in multiple positions within a cell in some embodiments. Turning to FIG. 4 is shown a schematic cross-sectional view of a portion of an energy storage device 400 according to embodiments of the present technology. Energy storage device 400 may be similar to energy storage device 300 described above, and may include similar components of a battery cell or cells, including a first current collector 152, a second current collector 154, a first active material 120, a second active material 110, and a separator 130. Energy storage device 400 may also include an electrolyte diffusion material 310 disposed between the first active material 120 and the first current collector 152. Any of the cell components, including electrolyte diffusion material 310, may be or include any of the materials previously described, and may be characterized by any of the properties discussed above.

Energy storage device 400 may include an additional electrolyte diffusion material 410 disposed between the second active material 110 and the second current collector 154.

Electrolyte diffusion material 410 may be similar or different from electrolyte diffusion material 310 described above. For example, electrolyte diffusion material 410 may include similar polymeric components and similar conductive components, although electrolyte diffusion material 410 may also include different conductive components depending on which components are used within the cell. For example, if first current collector 152 is copper, the conductive material included within electrolyte diffusion material 310 may be copper or a conductive material that is electrochemically stable at the potential at which first current collector 152 is being operated. Similarly, for example, second current collector 154 may be aluminum, and the conductive material included within electrolyte diffusion material 410 may be aluminum or a conductive material that is electrochemically stable at the potential at which second current collector 154 is being operated.

Electrolyte diffusion materials 310, 410 may be used in conjunction to deliver electrolyte through the cell. The thicknesses of the electrolyte diffusion materials 310, 410 may be adjusted based on an amount of electrolyte to be delivered. For example, if only a single electrolyte diffusion material 310 is utilized, such as described previously, the thickness may be associated with a volume of electrolyte to be delivered to the whole cell. When multiple electrolyte diffusion materials 310, 410 are utilized, each may deliver a portion of electrolyte to the cell. In embodiments, electrolyte diffusion material 310 and electrolyte diffusion material 410 may deliver equal amounts or substantially equal amounts of electrolyte to the cell. In some embodiments, electrolyte diffusion material 310 may deliver more or less electrolyte to the cell.

For example, each electrolyte diffusion material 310, 410 may be sized based on the previously described function for the respective electrode material. Electrolyte diffusion material 310 may be sized to deliver an amount of electrolyte for first active material 120, while electrolyte diffusion material 410 may be sized to deliver an amount of electrolyte for second active material 110. The amounts of electrolyte may be different for each active material based on properties of the active material as well as amounts of the active material. As a non-limiting example, second active material 110 may be a cathode active material. In some embodiments the cathode active material, as the main source of lithium ions for a lithium-ion battery, may be thicker than the anode active material. Accordingly, an amount of electrolyte to fill the free volume within second active material 110 may be greater than the amount to fill the first active material 120.

Accordingly, the amount, volume, or thickness of electrolyte diffusion material 410 may be greater than the amount, volume, or thickness of electrolyte diffusion material 310, to provide an additional amount of electrolyte. In some embodiments the volume or thickness may be similar, but a swelling ratio may be different between the two electrolyte diffusion materials. For example, electrolyte diffusion material 410 may be characterized by a higher swelling ratio from electrolyte diffusion material 310, to incorporate additional electrolyte within a comparable volume of residual electrolyte diffusion materials. Either electrolyte diffusion material may be characterized by any of the swelling ratios or other characteristics previously described.

Figure 5:
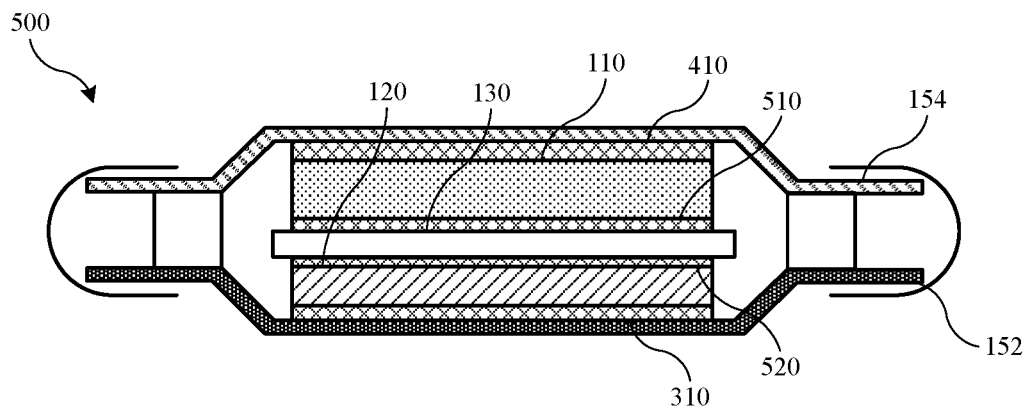
FIG. 5 shows a schematic cross-sectional view of a portion of an energy storage device according to embodiments of the present technology.

Electrolyte diffusion materials also may be incorporated adjacent the separator within a cell in some embodiments. Turning to FIG. 5 is shown a schematic cross-sectional view of a portion of an energy storage device 500 according to embodiments of the present technology. Energy storage device 500 may be similar to energy storage devices 300 or 400 described above, and may include similar components, including a first current collector 152, a second current collector 154, a first active material 120, a second active material 110, and a separator 130. In some embodiments, FIG. 5 may illustrate a particular battery cell where first active material 120 may be an anode active material, second active material 110 may be a cathode active material, first current collector 152 may be an anode current collector, and second current collector 154 may be a cathode current collector, although numbering may be switched for reversed components in other embodiments. The anode active material 120 may be disposed between the anode current collector 152 and the separator 130, and the cathode active material 110 may be disposed between the separator 130 and the cathode current collector 154. Any of these components may be or include any of the materials described elsewhere.

Energy storage device 500 may also include a first anode electrolyte diffusion material 310 disposed between the anode active material 120 and the anode current collector 152. Energy storage device 500 may also include a first cathode electrolyte diffusion material 410 disposed between the cathode active material 110 and the cathode current collector 154. Electrolyte diffusion materials 310, 410 may include any of the materials previously described, and may be characterized by any of the properties discussed above. Energy storage device 500 may also include a second cathode electrolyte diffusion material 510 disposed between the cathode active material 110 and the separator 130.

First cathode electrolyte diffusion material 410 and second cathode electrolyte diffusion material 510 may be or include similar materials, which may include any of the previously described materials. In some embodiments, the first cathode electrolyte diffusion material 410 and the second cathode electrolyte diffusion material 510 may be or include different materials. For example, first cathode electrolyte diffusion material 410 may be involved in the distribution of electrons between cathode active material 110 and cathode current collector 154. Accordingly, first cathode electrolyte diffusion material 410 may include a first conductive material incorporated within the first cathode electrolyte diffusion material 410. For example, first cathode electrolyte diffusion material 410 may be or include a polymer as previously described in which a conductive material may be incorporated. The conductive material may be any of the previously described conductive materials, and may be aluminum or a carbon-containing material in embodiments. Such conductive materials may be electrochemically stable at the operating potential of the cathode, and may limit the resistance that may otherwise be imparted by the residual first cathode electrolyte diffusion material 410 in the final cell after the electrolyte has been distributed.

Second cathode electrolyte diffusion material 510 may be characterized by different properties based on its location between the cathode active material 110 and the separator 130. For example, electronic transport may be less of a factor for second cathode electrolyte diffusion material 510, as it may not be involved with electron transportation, which may occur between the current collector and the active material. However, because second cathode electrolyte diffusion material 510 may be positioned between the active material 110 and the separator 130, it may be involved with ionic distribution through the cell. For example, if energy storage device 500 includes a lithium-ion battery cell, lithium ions may be distributed between the cathode active material and the anode active material across the separator during charging and discharging operations. Many separators are configured to allow ionic diffusion through the separator while limiting electronic diffusion through the separator. Because second cathode electrolyte diffusion material 510 is positioned in line with this transfer, it may be characterized, functionalized, or adjusted to allow ionic transport through the second cathode electrolyte diffusion material 510.

Second cathode electrolyte diffusion material 510 may or may not include conductive material within the structure unlike first cathode electrolyte diffusion material 410. In this way, first cathode electrolyte diffusion material 410 may be characterized by a conductivity greater than second cathode electrolyte diffusion material 510. However, second cathode electrolyte diffusion material 510 may be characterized by a structure that includes a porous polymer configured to permit ion diffusion through the second cathode electrolyte diffusion material 510. Second cathode electrolyte diffusion material 510 may include polymers similar to a separator to facilitate this transfer, and may also have adjusted characteristics to maintain ionic transport subsequent delivery of electrolyte to the cell. For example, second cathode electrolyte diffusion material 510 may have a lower swelling ratio than first cathode electrolyte diffusion material 410, which may limit or control the reduction in pore size as the second cathode electrolyte diffusion material 510 reduces in volume with the delivery of electrolyte into the cell.

Either cathode electrolyte diffusion material 410, 510 may be characterized by any swelling ratio previously described, although second cathode electrolyte diffusion material 510 may be characterized by a swelling ratio less than the swelling ratio of first cathode electrolyte diffusion material 410. Additionally, or alternatively, characteristics or constituent materials may be adjusted to maintain a minimal pore size sufficient to permit ionic transport through the second cathode electrolyte diffusion material 510. Because second cathode electrolyte diffusion material 510 may not reduce in volume or thickness to maintain sufficient pore sizing, second cathode electrolyte diffusion material 510 may be characterized by a thickness or volume that is greater than first cathode electrolyte diffusion material 410 in the final cell after delivery of electrolyte from the materials.

Energy storage device 500 may also include a second anode electrolyte diffusion material 520 in embodiments. The second anode electrolyte diffusion material 520 may be positioned or disposed between the anode active material 120 and the separator 130 in embodiments. Second anode electrolyte diffusion material 520 may be similar to second cathode electrolyte diffusion material 510 in embodiments, and may include any of the materials or characteristics previously described, including in relation to first anode electrolyte diffusion material 310. By including additional electrolyte diffusion materials adjacent the separator, and on opposite sides of the active materials, the time for permeation of electrolyte into the active materials may be reduced, and homogeneity of distribution may be increased.

In other embodiments, second cathode electrolyte diffusion material 510 and second anode electrolyte diffusion material 520 may be incorporated in a cell in lieu of first cathode electrolyte diffusion material 410 and first anode electrolyte diffusion material 310. Other combinations of electrolyte diffusion materials included within a cell are also encompassed. For example, one or more of the electrolyte diffusion materials of FIG. 5 may not be included. Additionally, any of the electrolyte diffusion materials may include multiple layers of materials, which may allow further tuning of properties. For example, multiple layers of a first electrolyte diffusion material may allow further control of the distribution of conductive material, which may reduce the overall amount of conductive material utilized per layer and overall within the electrolyte diffusion material.

Figure 6:
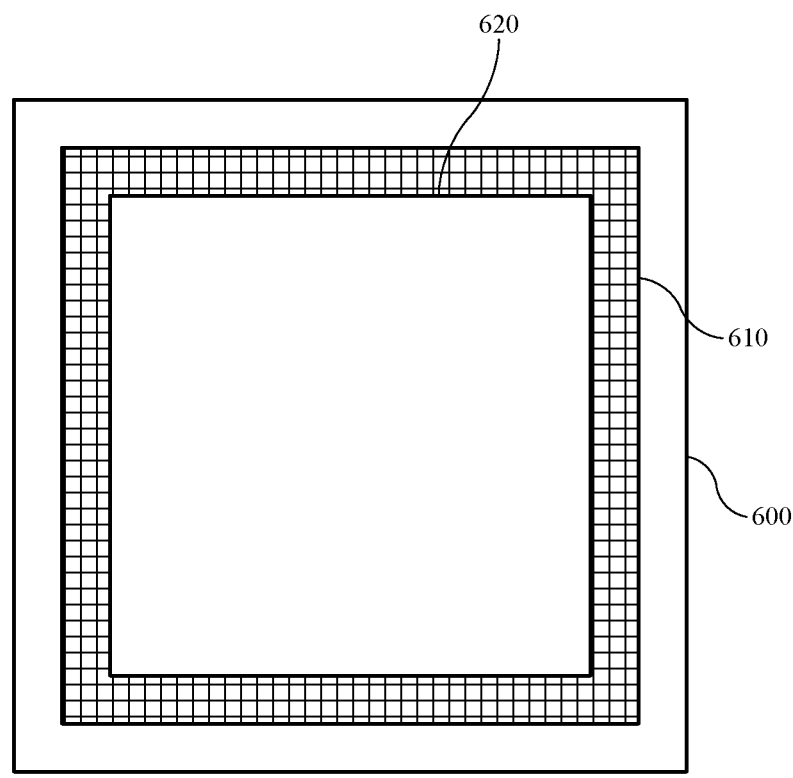
FIG. 6 shows a plan view of exemplary components of a battery cell according to embodiments of the present technology.

The electrolyte diffusion materials may be deposited or formed on a current collector or separator to cover a surface area relative to an associated active material to which the electrolyte diffusion material may distribute an amount of electrolyte. As one example of such a configuration, FIG. 6 shows a plan view of an exemplary current collector 600 according to embodiments of the present technology. Current collector 600 may be similar to any of the current collectors previously described, and may illustrate an example of how an electrolyte diffusion material 610 may be applied to a current collector. Current collector 600 may be similar to current collectors previously described in which electrolyte diffusion material 610 may be applied to an external surface of the current collector 600, while an active material 620 may be applied over the electrolyte diffusion material 610. As illustrated, electrolyte diffusion material 610 may be applied over a surface area of current collector 600 greater than a surface area of active material 620. This may allow a reduction in the thickness of electrolyte diffusion material 610 to provide a similar volume of electrolyte. Additional distributions are also understood to be encompassed. For example, an electrolyte diffusion material 610 characterized by a higher swelling ratio may be applied to a smaller surface area of the current collector than the active material due to the volume of electrolyte that may be incorporated within a particular volume of electrolyte diffusion material. Other configurations and distributions are to be understood to be equally encompassed, including with respect to application adjacent a separator material within a cell.

Figure 7:
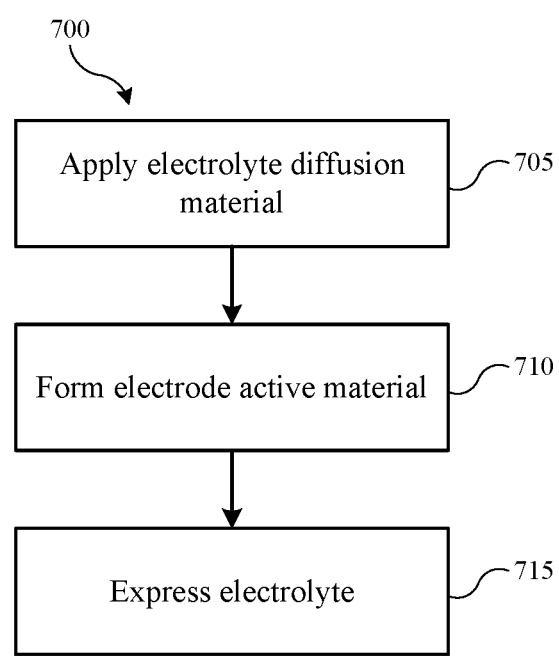
FIG. 7 shows operations from an exemplary method of forming a battery cell according to embodiments of the present technology.

FIG. 7 illustrates exemplary operations in a method 700 of forming a battery cell according to embodiments of the present technology. The method may encompass distributing electrolyte within an active material or throughout a cell utilizing one or more electrolyte diffusion materials as previously described. Method 700 is described in relation to an electrolyte diffusion material applied to a current collector, but it is to be understood that the method can be equally attributed to an electrolyte diffusion material applied to an active material or separator depending on the cell formation, and may also encompass the use of multiple electrolyte diffusion materials as previously described.

Method 700 may include applying an electrolyte diffusion material to a current collector at operation 705. In some embodiments the electrolyte diffusion material may be or include a polymer swelled with an electrolyte. The electrolyte diffusion material may include any of the components previously described, including a conductive material. In other embodiments, an electrolyte diffusion material may be applied to a current collector in a dry form or without the inclusion of electrolyte. Electrolyte may then be added and absorbed by the electrolyte diffusion material. At operation 710 an electrode active material may be formed on the electrolyte diffusion material. Additional optional operations may be involved that include a certain amount of heating, such as to release solvents, and compression to adjust porosity and distribution of the active material. The heating may be or include a low temperature heating which may release solvents without removing electrolyte from the electrolyte diffusion material. The method may also include application of a separator, additional active material, an additional current collector, and may include one or more additional electrolyte diffusion materials.

Method 700 may also include expressing the electrolyte into the electrode active material from the electrolyte diffusion material at operation 715. The electrolyte may be distributed from one or more compressive operations, which may include calendaring of a formed cell or cell layers, a vacuum applied to a formed cell, or other cell compression that may overcome a mechanical rigidity of the electrolyte diffusion material and release electrolyte into the cell, such as into the active material, separator, and other areas within the cell. Upon application of a force, and release of electrolyte from the electrolyte diffusion material, the volume of the electrolyte diffusion material may be reduced according to the swelling ratio of the particular material. After full release of the electrolyte, the electrolyte diffusion material may be reduced to a volume or thickness as explained in relation to any of the completed cells discussed throughout the disclosure. By performing methods as described, or utilizing components described above, a more homogenous delivery of electrolyte may be provided to active materials within a cell, and a time for electrolyte to permeate the cell components may be reduced compared to conventional designs.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included. Where multiple values are provided in a list, any range encompassing or based on any of those values is similarly specifically disclosed.

As used herein and in the appended claims, the singular forms "a", "an", and "the" include plural references unless the context clearly dictates otherwise. Thus, for example, reference to "a material" includes a plurality of such materials, and reference to "the cell" includes reference to one or more cells and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. A battery cell comprising:
   an anode current collector;
   a cathode current collector;
   a separator;
   an anode active material disposed between the anode current collector and the separator;
   a cathode active material disposed between the separator and the cathode current collector;
   a first anode electrolyte diffusion material disposed between the anode active material and the anode current collector;
   a first cathode electrolyte diffusion material disposed between the cathode active material and the cathode current collector; and
   a second cathode electrolyte diffusion material disposed between the cathode active material and the separator, wherein the anode electrolyte diffusion material, the first cathode electrolyte diffusion material, and the second cathode electrolyte diffusion material each comprise a porous polymer configured to permit ion diffusion, wherein the second cathode electrolyte diffusion material is characterized by a thickness greater than the first cathode electrolyte diffusion material.

2. The battery cell of claim 1, wherein the first cathode electrolyte diffusion material comprises a polymer having a first conductive material comprising aluminum or a carbon-containing material incorporated with the polymer.

3. The battery cell of claim 2, wherein the second cathode electrolyte diffusion material comprises a porous polymer configured to permit ion diffusion through the second cathode electrolyte diffusion material.

4. The battery cell of claim 3, wherein the first cathode electrolyte diffusion material is characterized by a swelling ratio of greater than or about 5 when contacted by an electrolyte, and wherein the second cathode electrolyte diffusion material is characterized by a swelling ratio of greater than or about 2 when contacted by an electrolyte.

5. The battery cell of claim 3, wherein the first cathode electrolyte diffusion material is characterized by an ionic conductivity greater than the second cathode electrolyte diffusion material.

6. The battery cell of claim 1, further comprising a second anode electrolyte diffusion material disposed between the anode active material and the separator.

7. The battery cell of claim 1, wherein at least one of the anode current collector and the cathode current collector comprises a polymer.

8. The battery cell of claim 1, wherein at least one of the electrolyte diffusion materials comprises poly(vinylidene fluoride-hexafluoropropylene).

* * * * *